United States Patent
Song et al.

(10) Patent No.: US 9,344,731 B2
(45) Date of Patent: *May 17, 2016

(54) IMAGE ENCODING AND DECODING APPARATUS AND METHOD

(71) Applicant: SK TELECOM CO., LTD., Seoul (KR)

(72) Inventors: Jinhan Song, Seoul (KR); Sunyeon Kim, Seoul (KR); Jeongyeon Lim, Seongnam-si (KR); Joohee Moon, Seoul (KR); Yunglyul Lee, Seoul (KR); Haekwang Kim, Seoul (KR); Byeungwoo Jeon, Seongnam-si (KR); Jongki Han, Seoul (KR); Hyoungmee Park, Suwon-si (KR); Mincheol Park, Bucheon-si (KR); Dongwon Kim, Seoul (KR); Kibaek Kim, Seoul (KR); Juock Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/808,916

(22) Filed: Jul. 24, 2015

(65) Prior Publication Data

US 2015/0334401 A1    Nov. 19, 2015

Related U.S. Application Data

(63) Continuation of application No. 13/503,169, filed as application No. PCT/KR2010/007252 on Oct. 21, 2010, now Pat. No. 9,137,545.

(30) Foreign Application Priority Data

| Oct. 21, 2009 | (KR) | 10-2009-0100443 |
| Apr. 16, 2010 | (KR) | 10-2010-0035446 |
| Apr. 16, 2010 | (KR) | 10-2010-0035456 |
| Apr. 16, 2010 | (KR) | 10-2010-0035536 |
| Oct. 21, 2010 | (KR) | 10-2010-0103075 |

(51) Int. Cl.
*H04N 19/61* (2014.01)
*H04N 19/167* (2014.01)
(Continued)

(52) U.S. Cl.
CPC .......... *H04N 19/167* (2014.11); *H04N 19/107* (2014.11); *H04N 19/109* (2014.11);
(Continued)

(58) Field of Classification Search
None
See application file for complete search history.

(56) References Cited

U.S. PATENT DOCUMENTS

| 4,205,341 A | 5/1980 | Mitsuya et al. |
| 5,936,673 A | 8/1999 | Agarwal |

(Continued)

FOREIGN PATENT DOCUMENTS

| CN | 101610417 A | 12/2009 |
| KR | 1019970073150 A | 11/1997 |

(Continued)

OTHER PUBLICATIONS

International Search Report mailed Jul. 25, 2011 for PCT/KR2010/007252.

*Primary Examiner* — Sath V Perungavoor
*Assistant Examiner* — Peter D Le
(74) *Attorney, Agent, or Firm* — Hauptman Ham, LLP (57) ABSTRACT

An apparatus of decoding a video in the unit of blocks, includes: a size setting unit to decode information on a picture size of the video and information on available block sizes from a bitstream, set an initial size of a current block to be decoded to a largest block size determined by the information on the available block sizes, determine a location of the current block within a picture, identify whether the current block is fully located inside the picture, based on the picture size, the size of the current block and the location of the current block, and reset the size of the current block to a smaller size among the available block sizes, when the current block is not fully located inside the picture; and a decoding unit to decode the current block in the reset size.

6 Claims, 8 Drawing Sheets

(51) Int. Cl.
  *H04N 19/124* (2014.01)
  *H04N 19/107* (2014.01)
  *H04N 19/18* (2014.01)
  *H04N 19/172* (2014.01)
  *H04N 19/176* (2014.01)
  *H04N 19/46* (2014.01)
  *H04N 19/109* (2014.01)
  *H04N 19/55* (2014.01)

(52) U.S. Cl.
  CPC ........... *H04N19/124* (2014.11); *H04N 19/172* (2014.11); *H04N 19/176* (2014.11); *H04N 19/18* (2014.11); *H04N 19/46* (2014.11); *H04N 19/55* (2014.11); *H04N 19/61* (2014.11)

(56) References Cited

U.S. PATENT DOCUMENTS

| | | | |
|---|---|---|---|
| 6,125,143 A | | 9/2000 | Suzuki et al. |
| 6,188,796 B1 * | | 2/2001 | Kadono ............... H04N 19/503 375/240.08 |
| 6,560,371 B1 | | 5/2003 | Song et al. |
| 6,697,425 B1 | | 2/2004 | Nakagawa et al. |
| 7,742,531 B2 | | 6/2010 | Xue et al. |
| 2002/0094038 A1 * | | 7/2002 | Okamura .......... H03M 13/2957 375/340 |
| 2004/0247192 A1 | | 12/2004 | Kajiki et al. |
| 2005/0062885 A1 | | 3/2005 | Kadono et al. |
| 2006/0087585 A1 | | 4/2006 | Seo et al. |
| 2007/0217512 A1 | | 9/2007 | Matsuda et al. |
| 2009/0003433 A1 * | | 1/2009 | Honjo .................... H04N 19/61 375/240.01 |
| 2009/0046781 A1 * | | 2/2009 | Moriya ................... H04N 7/50 375/240.12 |
| 2009/0290636 A1 | | 11/2009 | Liu et al. |

FOREIGN PATENT DOCUMENTS

| | | |
|---|---|---|
| KR | 1020000077241 A | 12/2000 |
| KR | 1020050035480 A | 4/2005 |
| KR | 1020080114375 A | 12/2008 |
| WO | 2010039733 A2 | 4/2010 |

* cited by examiner

IMAGE ENCODING AND DECODING APPARATUS AND METHOD

CROSS-REFERENCE TO RELATED APPLICATIONS

The present application is a continuation of U.S. patent application Ser. No. 13/503,169 filed Apr. 20, 2012, which is a the National Phase application of International Application No. PCT/KR2010/007252, filed Oct. 21, 2010, which is based upon and claims the benefit of priorities from Korean Patent Application No. 10-2009-0100443, filed on Oct. 21, 2009, Korean Patent Application No. 10-2010-0035446, filed on Apr. 16, 2010, Korean Patent Application No. 10-2010-0035456, filed on Apr. 16, 2010, and Korean Patent Application No. 10-2010-0035536, filed on Apr. 16, 2010, and Korean Patent Application No. 10-2010-0103075, filed on Oct. 21, 2010. The disclosures of the above-listed applications are hereby incorporated by reference herein in their entirety.

TECHNICAL FIELD

The present disclosure relates to an apparatus and a method for efficiently encoding and decoding an outer area of an input image having a different size than an integer multiple of a macroblock size.

BACKGROUND

The statements in this section merely provide background information related to the present disclosure and do not constitute the prior art.

Standardized technologies for compressing image data currently include H.261, H.263, H.264, MPEG-2, MPEG-4, and so on. According to such known technologies for compressing an image, each image is divided into macroblocks having a fixed size and then encoded in the unit of macroblocks.

When the size of an input image is not an integer multiple of the size of a macroblock, the input image is padded such that it becomes an integer multiple of the size of the macroblock, all luma components and all chroma components of each macroblock within the padded input image are spatially or temporally predicted, and then a predicted residual is compressed through processes such as a transform, a quantization, and an entropy coding.

However, the inventor(s) has experienced that in a general technology for compressing an image, when the size of the input image is not an integer multiple of the size of the macroblock, it is difficult to determine an optimal type of the macroblock and an optimal prediction mode because the macroblock type and prediction mode are determined including a padded area after the input image is padded such that the size of the input image becomes an integer multiple of the size of the macroblock, and the encoding efficiency may be deteriorated because a bitstream including data of the padded area is generated.

Further, the inventor(s) has experienced that since decoding an image is carried out in correspondence with the image encoding, the already decreased compression efficiency of encoding a high resolution image would make it difficult to expect a highly efficient decoding.

SUMMARY

An embodiment of the present disclosure provides an apparatus of decoding a video in the unit of blocks. the apparatus comprises a size setting unit, and a decoding unit. The size setting unit is configured to decode information on a picture size of the video and information on available block sizes from a bitstream, set an initial size of a current block to be decoded to a largest block size determined by the information on the available block sizes, determine a location of the current block within a picture, identify whether the current block is fully located inside the picture, based on the picture size, the size of the current block and the location of the current block, and reset the size of the current block to a smaller size among the available block sizes, when the current block is not fully located inside the picture. And the decoding unit is configured to decode the current block in the reset size.

DETAILED DESCRIPTION

Hereinafter, some embodiments of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

A video encoding apparatus and a video decoding apparatus, which will be described later, may be a personal computer or PC, notebook or laptop computer, personal digital assistant or PDA, portable multimedia player or PMP, PlayStation Portable or PSP, or mobile communication terminal, smart phone or such devices, and represent a variety of apparatuses equipped with, for example, a communication device such as a modem for carrying out communications between various devices or wired/wireless communication networks, a memory for storing various programs for encoding images and related data, and a microprocessor for executing the programs to effect operations and controls.

In addition, the image encoded into a bitstream by the video encoding apparatus may be transmitted in real time or non-real-time to the video decoding apparatus for decoding the same where it is reconstructed into the image and reproduced into dynamic images after being transmitted via a wired/wireless communication network including the Internet, a short range wireless communication network, a wireless LAN network, WiBro (Wireless Broadband) also known as WiMax network, and mobile communication network or a communication interface such as cable or USB (universal serial bus).

Some embodiments of the present disclosure describe methods of encoding and/or decoding an outer area of an input image, which overlaps a partial area of a macroblock, when the size of the input image is not an integer multiple of the size of the macroblock.

Some embodiments of the present disclosure provide an apparatus and a method for efficiently encoding and decoding an outer area of an input image having a different size than an integer multiple of a macroblock size, wherein borderline parts (blocks) located beyond a boundary of the input image are assumptively encoded and/or decoded as being in a mode generating the smallest number of bits, or prediction, transform or such information data in the borderline parts (blocks) is exempted from the encoding/decoding, or the input image is encoded and/or decoded by using a variable macroblock size when encoding and decoding the outer area of the input image. Some embodiments of the present disclosure provide to improve the compression efficiency and the reconstruction efficiency in encoding and decoding images when the size of the input image is not an integer multiple of an arbitrary macroblock size by encoding and/or decoding parts (blocks) located beyond a boundary of the input image based on an assumption that they are in a mode generating the smallest number of bits, or prohibiting data such as prediction information or transform information in the parts (blocks) located beyond the boundary of the input image from being encoded and/or decoded, or by using the variable macroblock size.

Figure 1:
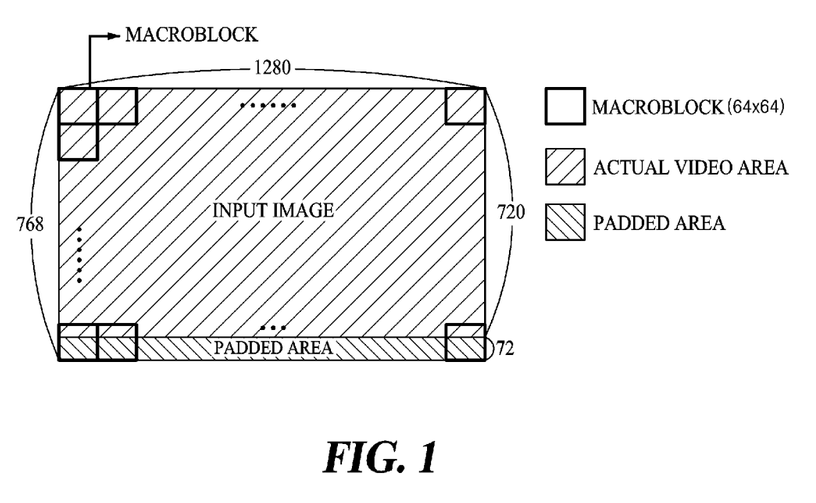
FIGS. 1 and 2 are views for describing a video encoding and a video decoding when a image input according to a known encoding and/or decoding method is padded such that the input image becomes an integer multiple of the size of a macroblock.
Figure 2:
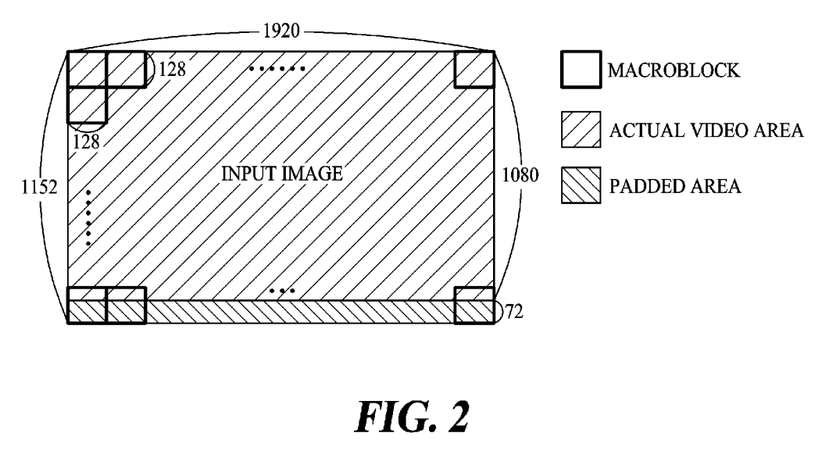
Figure 3:
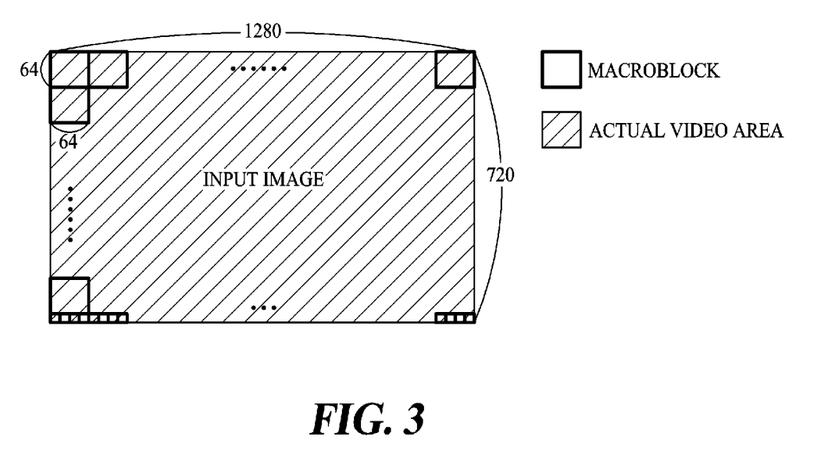
FIGS. 3 and 4 are views of a video encoding and a video decoding using a macroblock having a variable size according to at least one embodiment of the present disclosure.
Figure 4:
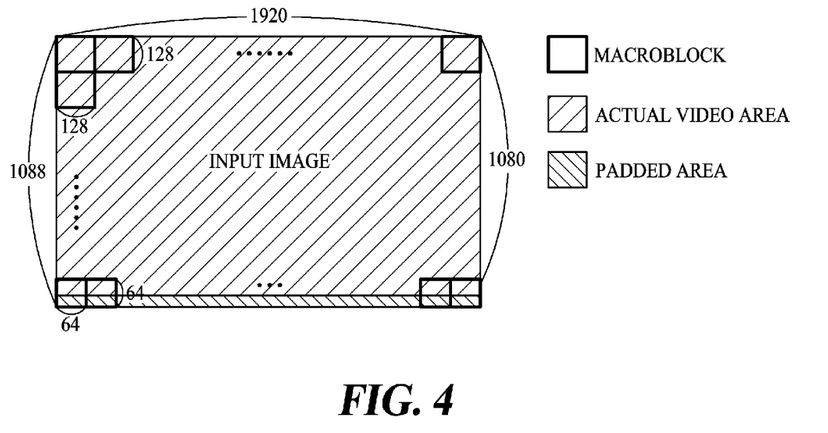

FIGS. 1 and 2 are views for describing a video encoding and a video decoding when an image input according to a known encoding and/or decoding method is padded such that the size of the input image becomes an integer multiple of the size of a macroblock, and FIGS. 3 and 4 are views for describing a video encoding and a video decoding by using a macroblock having a variable size according to some embodiments of the present disclosure.

When the input image is sized 1280×720 and a macroblock is of 64×64, the known encoding and/or decoding method pads the input image to have a size of 1280×768, which is an integer multiple of the size of the macroblock, as shown in FIG. 1, and then divides the padded input image into a total of 240 macroblocks to perform encoding and decoding of the input image in the unit of macroblocks. Twenty macroblocks located at the bottom each has an area of 64×16 which is included in an actual input image and an area of 64×48 which is not included in the actual input image.

As another example, when the size of the input image is 1920×1080 and the size of the macroblock is 128×128, the known encoding and/or decoding methods pad the input image to have a size of 1920×1152, which is an integer multiple of the size of the macroblock, as shown in FIG. 2. And then the padded input image is divided into a total of 135 macroblocks and the input image is encoded and decoded in the unit of macroblocks. Fifteen macroblocks located at the bottom each has a pixel area of 128×56 which is included in an actual input image and a pixel area of 128×72 which is included in the padded area.

When the horizontal size of the input image is not an integer multiple of horizontal size of the macroblock or the vertical size of the input image is not an integer multiple of vertical size of the macroblock, the macroblock is located at a boundary of the input image. As shown in FIGS. 1 and 2, the macroblock is located at the bottom boundary of the input image, and since the macroblocks located at the bottom boundary have data more in the padded area than that in the actual image area, the macroblocks may be determined in a wrong prediction mode or macroblock type. That is, there may be changes in the prediction mode and the macroblock type from those determined by using only the actual image area. Also, the performance of the encoding and the decoding may be deteriorated since the bitstream is generated to include the data in the padded area.

In order to solve the above problem, a macroblock having a small size of 16×16 may be used for the encoding, but the method of encoding/decoding an entire image by using the macroblock having a small size is not effective because it is efficient to encode a high resolution image in the unit of larger blocks.

Accordingly, some embodiments of the present disclosure use macroblocks having a large size when encoding/decoding an inner area of the input image, and use macroblocks having a variable size in order to minimize the data in the padded area when encoding/decoding an outer area of the input image. As a result, an effective encoding/decoding is performed for the outer area of the input image while maintaining the encoding/decoding efficiency which can be obtained through the use of the macroblocks having a large size. In this event, an encoder (or encoding apparatus) and a decoder (or decoding apparatus) can obtain the size of the macroblock used for encoding/decoding the outer area of the input image by using the same method as long as the sizes of the input image and the macroblock are known, and thus additional information on the size of the macroblock is not required.

Based on a video encoding/decoding method according to at least one embodiment of the present disclosure shown in FIG. 3, when the input image size is 1280×720 and the macroblock size is 64×64, a pixel area of 1280×16 located at the bottom part of the input image, which is overlapped with a partial area of the macroblock, is encoded/decoded by using a macroblock having size 16×16 preventing other data than the input image from being used. Further, data encoded into the bitstream uses only a pixel value included in the actual input image, too.

FIG. 4 illustrates a video encoding/decoding according to at least one embodiment of the present disclosure. When the input image size is 1920×1080 and the macroblock size is 128×128, a pixel area of 1920×1024 of the input image is encoded/decoded by using a macroblock having size 128×128, and a pixel area of 1920×56 located at the bottom part of the input image, which is overlapped with a partial area of the macroblock, is encoded/decoded by using a macroblock having a reset size in a scale obtained by reducing the original size of the macroblock with a predetermined ratio or to a predetermined size. Even when the pixel area of 1920×56 is encoded by using the macroblock having the reset size, it is determined whether the partial area of the macroblock is overlapped with the input image and how much of an area is overlapped. When the pixel area of 1920×56 is encoded/decoded by using the macroblock having the reset size, if the area in which the input image is overlapped with the macroblock has a predetermined size, for example, the area is the same as or larger than ½ of the macroblock, the encoding/decoding is performed by using the macroblock having the reset size. In this event, if the area in which the input image is overlapped with the macroblock has a predetermined size, for example, the area is the same as or larger than ½ of the macroblock and only a partial area of the macroblock is overlapped with the input image, the encoding/decoding is performed after performing the padding.

When the pixel area of 1920×56 is encoded/encoded by using the macroblock having the reset size, if the area in which the input image is overlapped with the macroblock has a predetermined size, for example, the area is smaller than ½ of the macroblock, the size of the macroblock is reset and the encoding/decoding is performed by using the aforementioned method.

For example in FIG. 4, it is determined whether to reset the size of the macroblock by using a reduction ratio of ½ for reducing the size of the macroblock when the pixel area of 1920×56 located at the bottom of the input image is encoded/decoded. Since the input image is overlapped with only a pixel area of 125×56 within the macroblock having size 128× 128 and the overlapped area is smaller than ½ of the macroblock, the size of the macroblock is reset by using a predetermined reduction ratio, for example, ½. Accordingly, since the input image is overlapped with pixel area 64×56 within a macroblock having reset size 64×64 and the overlapped area is the same as or larger than ½ of the macroblock, the area located at the bottom of the input image is encoded/decoded using the macroblock sized 64×64. In this event, the input image is overlapped with only the pixel area of 64×56, which is a partial area of the macroblock, so that the remaining pixel area of 64×16 is padded.

Figure 5:
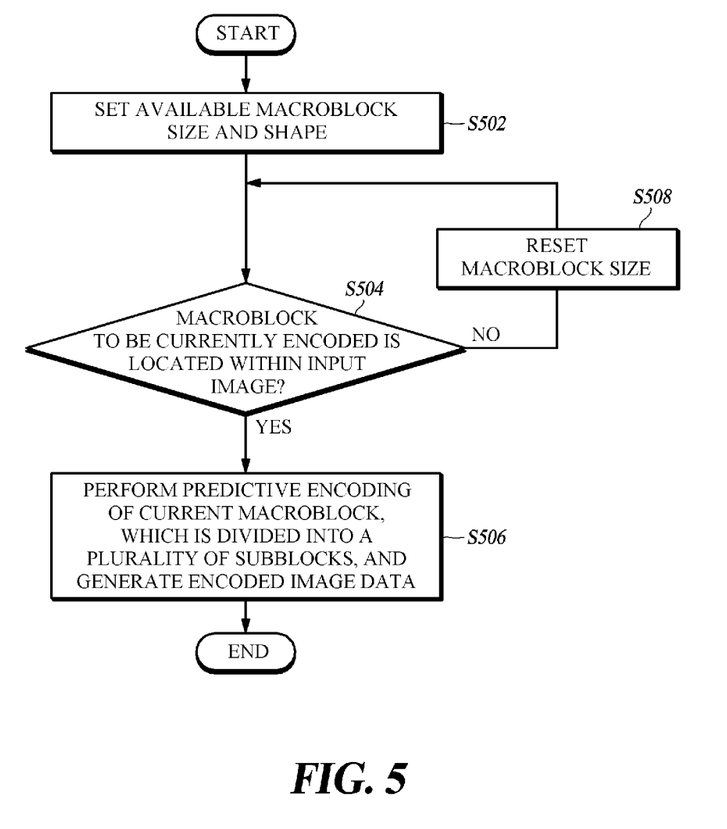
FIG. 5 is a flowchart of a video encoding method according to at least one embodiment of the present disclosure.

FIG. 5 is a flowchart illustrating a video encoding method according to at least one embodiment of the present disclosure.

Based on the video encoding method according to at least one embodiment of the present disclosure, a video encoding apparatus sets one or more available macroblock sizes and shapes at step S502. The available macroblock sizes and shapes may be input by a user or determined by a transform type or size of a subblock within the available macroblock. Alternatively, the sizes and shapes may be included in a determined candidate group input by other apparatuses. Further, the available macroblock sizes and shapes may have one or more sizes and shapes such as 64×64, 32×32, 16×16, and 8×8. However, the available macroblock sizes should be a multiple of a positive integer of an available transform size.

For example, when the available macroblock size is determined by a transform size or a subblock size within the macroblock and the subblock available for the prediction are sized 4×4, 4×8, 8×4, 8×8, 16×8, 8×16, 16×16, 16×32, 32×16, 32×32, 32×16, 32×32, 32×64, 64×32, and 64×64 and available transform sizes are 4×4, 8×8, and 16×16, the available macroblock sizes may be the same as type of subblocks within the macroblock. That is, the available macroblock sizes may be 4×4, 4×8, 8×4, 8×8, 16×8, 8×16, 16×16, 16×32, 32×16, 32×32, 32×16, 32×32, 32×64, 64×32, and 64×64.

Information on the available macroblock sizes and shapes is included in information of a sequence header, a picture, or a slice header, and may be encoded into the bitstream.

Further, the available macroblock sizes and shapes may be internally determined depending on the subblock types used in the transform and in the prediction by the encoding and decoding apparatuses. In this event, information on the available macroblock sizes and shapes is not encoded into the bitstream.

Furthermore, information on the input image size is encoded in the sequence header, and the decoder extracts and encodes information on the input image size from the bitstream and uses the reconstructed information on the input image size for decoding each macroblock.

Hereinafter, for the sake of simplicity, descriptions for a process of encoding and decoding the information on the input image size in and out of the sequence header will be omitted from the respective embodiments of the present disclosure.

When the input image is encoded in the unit of macroblocks by using the available macroblock size and the shape agreed between the encoding and decoding apparatuses, if a macroblock to be currently encoded is fully located within the input image at step S504, a predictive encoding is performed the current macroblock having a reference size, which is divided into a plurality of subblocks, generating encoded image data to complete encoding the current macroblock to encode and start encoding of a subsequent macroblock at step S506.

When the macroblock to be currently encoded is not fully included within the input image, the macroblock to be currently encoded is reset to a new size at step S508. In a method of resizing the macroblock, the size of the macroblock is reset by reducing a horizontal size and a vertical size of the macroblock in a predetermined ratio, for example, ½ of the macroblock. Alternatively, the macroblock is reset to the largest size among the available macroblock sizes, which allows the macroblock to be located within the input image. However, the reset size of the macroblock is preferably one of the available macroblock sizes and smaller than the size of the current macroblock.

Further, the largest size of the macroblock, which allows the macroblock to be located within the input image, among the available macroblock sizes may be determined as the reset size of the macroblock. An example shown in FIG. 3 is discussed in the following description. When the available macroblock sizes are 64×64, 64×32, 64×16, 64×8, 64×4, 32×64, 16×64, 8×64, 4×64, 32×32, 32×16, 32×8, 32×4, 16×32, 8×32, 4×32, 16×16, 16×8, 16×4, 8×16, 4×16, 8×8, 8×4, 4×8, and 4×4, if the input image is overlapped with a pixel area of 64×16 of the macroblock, the size of the macroblock is reset. Sizes of the macroblock, which allow the macroblock to be located within the input image, among the available macroblock sizes include 64×16, 64×8, 64×4, 32×16, 32×8, 32×4, 16×16, 16×8, 16×4, 8×16, 4×16, 8×8, 8×4, 4×8, and 4×4. Size 64×16, the largest among the listed sizes, is determined as a size of the current macroblock and a predictive encoding is performed on the macroblock to be currently encoded, generating encoded image data to complete encoding the current macroblock and resize the macroblock to 64×64, a reference macroblock size, before starting to encode a subsequent macroblock.

When the available macroblock sizes include 64×64, 64×32, 64×16, 64×8, 64×4, 32×64, 16×64, 8×64, 4×64, 32×32, 32×16, 32×8, 32×4, 16×32, 8×32, 4×32, 16×16, 16×8, 16×4, 8×16, 4×16, 8×8, 8×4, 4×8, and 4×4 and the input image is overlapped with a pixel area of 64×48 within the macroblock, macroblock sizes among the available macroblock sizes, which allow the macro block to be located within the input image, include 64×32, 64×16, 64×8, 64×4, 32×32, 32×16, 32×8, 32×4, 16×32, 8×32, 4×32, 16×16, 16×8, 16×4, 8×16, 4×16, 8×8, 8×4, 4×8, and 4×4. The largest 64×32 among the above sizes is determined as the current macroblock size and a predictive encoding is performed on the macroblock to be currently encoded, generating encoded image data to complete encoding the current macroblock and resize the macroblock to 64×64, the reference macroblock size before starting to encode a subsequent macroblock.

When the available macroblock sizes include 64×64, 32×32, 16×16, 8×8, and 4×4 and a predetermined size or ratio to reset the size of the macroblock is selected to be ½, the encoding method may be described as follows referring to FIG. 3.

First, sizes of 64×64, 32×32, 16×16, 8×8, and 4×4 are set as the available macroblock size information. It is determined whether the macroblock to be currently encoded is fully located within the input image. When the macroblock is fully located within the input image, the input image is encoded in the unit of 64×64 and image data is generated. A macroblock having size 64×64, which is located at the bottom of the input image, is not fully located within the input image and only a partial area of the macroblock is overlapped with the input image, and thus the size of the macroblock is reset to size 32×32 and then it is again determined whether the reset size of the current macroblock is fully located within the input image or only a partial area of the current macroblock is overlapped with the input image. The macroblock having the size 32×32 is also overlapped with only a partial area of the input image, and thus the macroblock is reset to a size of 16×16, which corresponds to a half size both horizontally and vertically and it is determined again whether the size of the current macroblock is fully located within the input image or only a partial area of the current macroblock is overlapped with the input image. The macroblock having the reset size of 16×16 is fully included within the input image and the size 16×16 is determined as the current macroblock size and a predictive encoding is performed on the current macroblock for the encoding, generating encoded image data to complete encoding the current macroblock, and an encoding of a subsequent macroblock is started.

Figure 6:
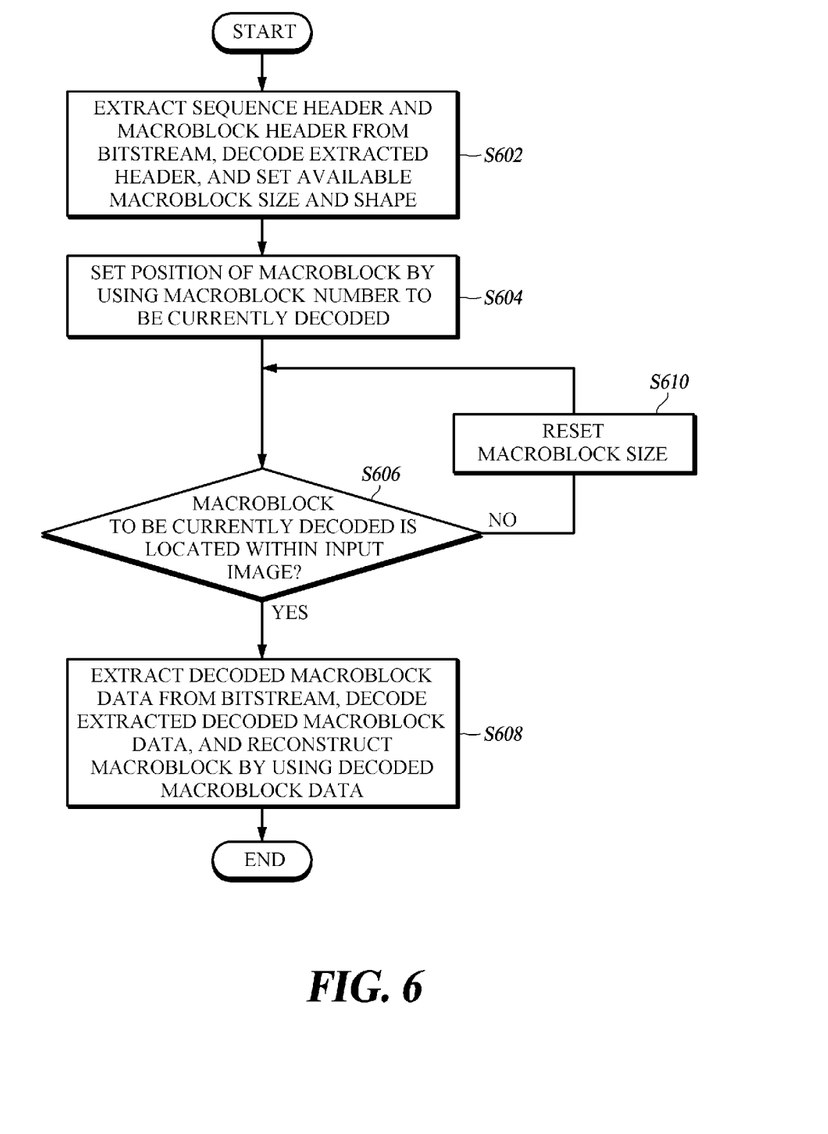
FIG. 6 is a flowchart of a video decoding method according to at least one embodiment of the present disclosure.

FIG. 6 is a flowchart illustrating a video decoding method according to at least one embodiment of the present disclosure.

Based on the video decoding method according to at least one embodiment of the present disclosure, a video decoding apparatus sets one or more available macroblock sizes at step S602. The available macroblock sizes may be determined by an available subblock size or transform type, or set by extracting information on the available macroblock sizes. Further, the available macroblock sizes may be included in a determined candidate group input by other apparatuses. In this event, a method of setting the available macroblock sizes includes a method agreed with an encoding apparatus among the aforementioned methods.

When the available macroblock sizes are determined by information extracted from the bitstream, corresponding information is extracted from positions agreed with the encoding apparatus as at a sequence header, a picture header, a slice header, or a macroblock header and then decoded to set the available macroblock sizes.

Further, when the available macroblock sizes are determined by a subblock type used in the transform or the prediction, the information on the available macroblock sizes is set autonomously in the decoding apparatus in a method agreed with the encoding apparatus.

After the sequence header and the macroblock header are extracted from the bitstream and decoded, available macroblock sizes and shapes are set by using a method agreed with the encoding apparatus and the position of a macroblock to be currently decoded within the input image is calculated by using a number assigned to the macroblock to be currently decoded at step S604. When the macroblock to be currently decoded is fully located within the input image at step S606, encoded macroblock data is extracted from the bitstream and decoded by using a reference macroblock size and a decoding of the macroblock is performed using the decoded macroblock data at step S608. When the macroblock to be currently decoded is not fully located within the input image at step S606, the macroblock size is reset through a method agreed with the encoding apparatus and it is determined whether the macroblock to be currently decoded is fully located within the input image or only a partial area of the macroblock is overlapped with the input image by using the reset macroblock size. When the macroblock is fully located within the input image, a decoding is performed on the macroblock by using the reset macroblock size. When only the partial area of the macroblock is overlapped with the input image, the macroblock size is reset at step S610.

Figure 7:
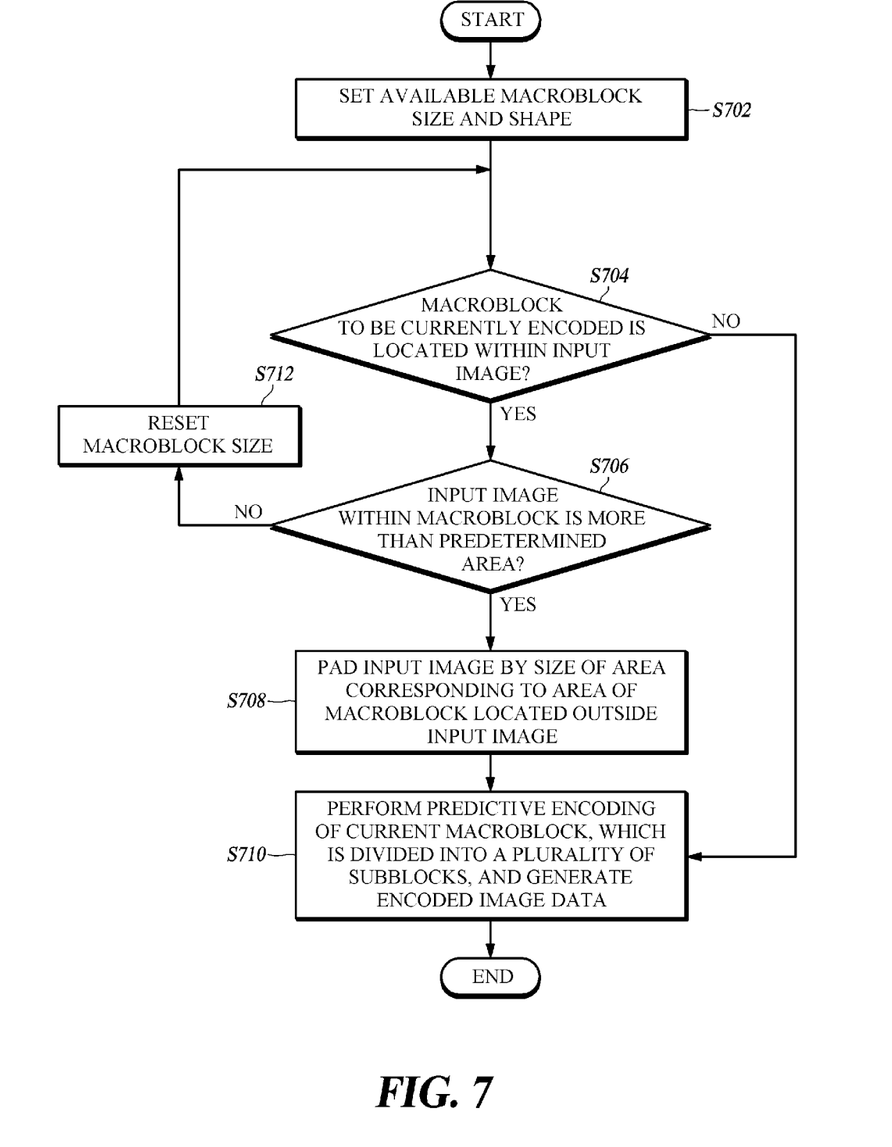
FIG. 7 is a flowchart of a video encoding method according to at least one embodiment of the present disclosure.

FIG. 7 is a flowchart illustrating a video encoding method according to at least one embodiment of the present disclosure.

Based on the video encoding method according at least one embodiment of the present disclosure, a video encoding apparatus sets one or more available macroblock sizes and shapes by using the aforementioned method at step S702. When the macroblock to be currently encoded is fully located within the input image at step S704, a predictive encoding is performed on the current macroblock which is divided into a plurality of subblocks, generating encoded image to complete encoding the macroblock to be currently encoded before starting to encode a subsequent macroblock at step S710.

When the macroblock to be currently encoded is not fully located within the input image and a predetermined area, for example, only an area the same as or larger than ½ of the macroblock is overlapped with the input image at steps S704 and S706, an area of the input image corresponding to an area of the macroblock, which is located outside of the actual input image, is padded at step S708. And then, a predictive encoding is performed on the macroblock to be currently encoded, generating encoded image data to complete encoding the macroblock to be currently encoded before starting to encode a subsequent macroblock at step S710.

When the macroblock to be currently encoded is not fully located within the input image and a predetermined area, for example, only an area smaller than ½ of the macroblock is overlapped with the input image at steps S704 and S706, the macroblock size is reset through the aforementioned method and then it is determined whether the current macroblock having the reset size is fully located within the input image and how much the macroblock is overlapped with the input image when the macroblock is not fully located within the input image. And then, step S712 repeats the aforementioned process of encoding the input image by using the current macroblock size, or encoding the input image by using the current macroblock size after padding the input image, or resetting the macroblock size.

When the encoding is performed including parts or blocks located beyond a boundary of the input image within the macroblock, for example, as encoding the macroblock located at the bottom part of the input image shown in FIG. 4, macroblocks are encoded/decoded including their parts located beyond the boundary of the actual input image, that is, the padded areas based on an assumption that they are in a mode generating the smallest number of bits or else encoding/decoding is not performed on data of the blocks located beyond the boundary.

Hereinafter, a method will be described for encoding the macroblocks including the parts (blocks) located beyond the boundary of the input image within the macroblock.

Each macroblock is divided into a plurality of subblocks and then an intra predictive encoding or an inter predictive encoding of the divided subblocks is performed.

In this event, for subblocks located within the input image, an intra prediction mode or an inter prediction mode (i.e. information on a reference picture and a motion vector) is determined in consideration of both an error value between a block to be encoded and a reconstructed block and the number of bits required for encoding the block to be encoded. Further, information on the determined mode is encoded into the bitstream and each block is reconstructed by using the information on the determined mode. For subblocks located outside of the input image, an intra prediction mode or an inter prediction mode (i.e. information on a reference picture and a motion vector) is determined in consideration of only the number of bits required for encoding the block to be encoded. Further, information on the determined mode is encoded into the bitstream and each block is reconstructed according to the information on the determined mode. That is, when the prediction encoding is performed, a current subblock is encoded in a mode generating the smallest number of bits in consideration of only the number of generated bits required for a data encoding such as prediction mode information, transform information, and transform coefficient information.

Alternatively, the subblocks located within the input image are encoded by using the aforementioned method. For the subblocks located outside the input image, an intra prediction mode or an inter prediction mode (i.e. information on a reference picture and a motion vector) is determined in consideration of only the number of bits required for encoding the block to be encoded. Further, information on the determined mode is encoded into the bitstream and each block is reconstructed by using a method of padding the input image in generating the reconstruction block. That is, when the input image is padded, if the padding is implemented by inserting a pixel value of 128 into the parts located beyond the boundary of the input image, all pixel values within the reconstructed block of the subblocks located outside the input image are 128.

Further, the subblocks located within the input image may be encoded by using the aforementioned method, and data such as the prediction information, the transform information, or the transform coefficient information of the subblocks located outside the input image may be encoded into the bitstream, and each block in generating the reconstructed blocks may be reconstructed by using the method of padding the input image.

The aforementioned method of encoding the macroblock including the parts (blocks) located beyond the boundary of the input image within the macroblock may be used in combination with the known encoding method.

Figure 8:
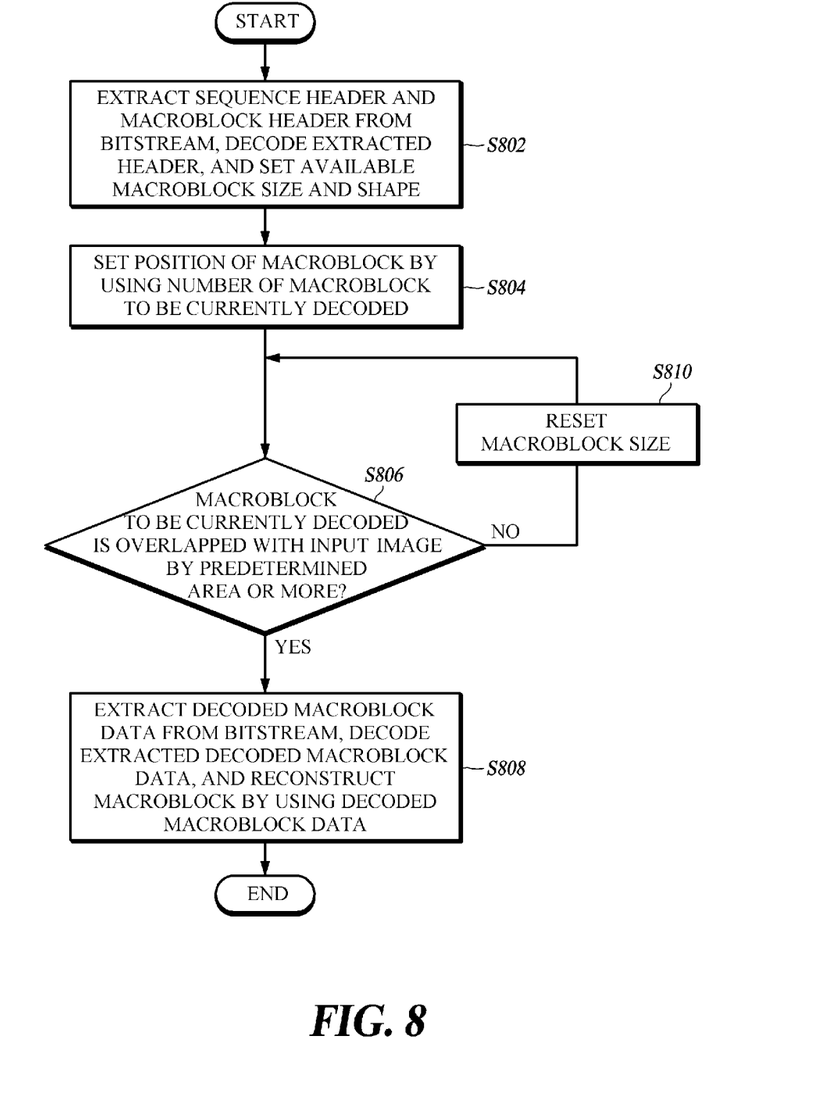
FIG. 8 is a flowchart of a video decoding method according to at least one embodiment of the present disclosure.

FIG. 8 is a flowchart illustrating a video decoding method according to at least one embodiment of the present disclosure.

First, a video decoding apparatus sets one or more available macroblock sizes by using a method agreed with an encoding apparatus at step S802. When the available macroblock sizes are determined by information extracted from the bitstream, corresponding information is extracted from positions agreed with the encoding apparatus as at a sequence header, a picture header, a slice header, or a macroblock header and then decoded to set the available macroblock sizes.

Alternatively, when the available macroblock sizes are determined by a subblock type used in the transform or the prediction, the information on the available macroblock sizes is set autonomously in the decoding apparatus in a method agreed with the encoding apparatus.

After the sequence header and the macroblock header are extracted from the bitstream and decoded, available macroblock sizes and shapes are set by using a method agreed with the encoding apparatus and a position of a macroblock to be currently used for the decoding within the input image is calculated by using a number assigned to the macroblock to be currently used for the decoding at step S804.

When the macroblock to be currently decoded is fully located within the input image or when the macroblock is not fully located within the input image and an area the same as or larger than ½ of the macroblock is overlapped with the input image at step S806, encoded macroblock data is extracted from the bitstream and decoded and a decoding of the macroblock is performed by using the decoded macroblock data at step S808.

When the macroblock to be currently decoded is not fully located within the input image and a predetermined area, for example, an area smaller than ½ of the macroblock is overlapped with the input image at step S806, the macroblock size is reset through the aforementioned method and then it is determined how much the current macroblock having the reset size is overlapped with the input image. And then the macroblock size is reset or the macroblock having the currently set size is decoded at step S810.

Hereinafter, an example of an apparatus for encoding and decoding an image in the unit of blocks will be described. Here, the block may be a macroblock having a size of M×N (however, M and N may be integers the same as or larger than 16) or a lower block or a subblock having a size of O×P (however, O and P are integers the same as or smaller than M or N). The encoding and decoding of the image in the unit of blocks are taken only for an illustration, and the encoding and decoding of the image may be performed by unit of typical areas such as blocks or by unit of atypically formed areas. However, a video encoding/decoding apparatus, which will be described later, can use a block having an arbitrary size, and the block size is agreed between the video encoding and decoding apparatuses.

Figure 9:
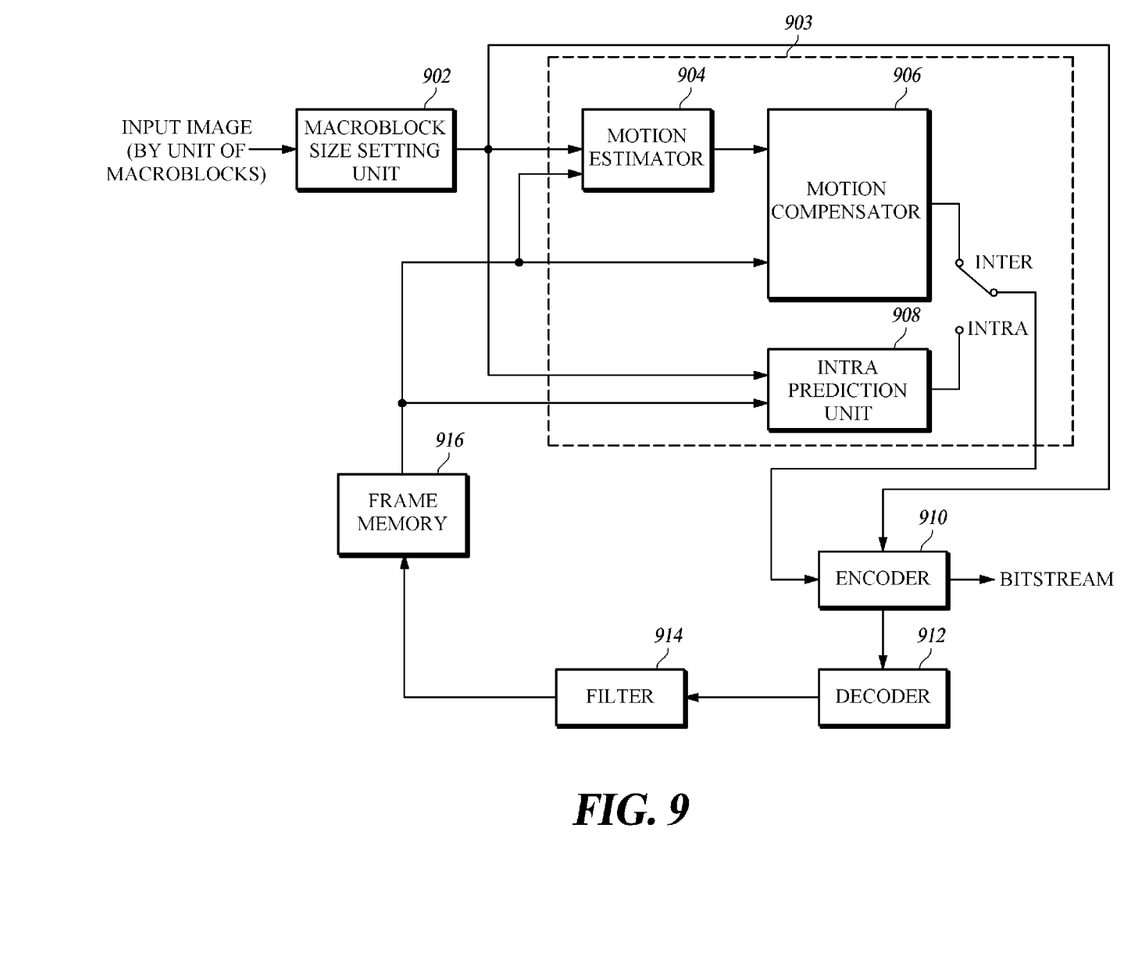
FIG. 9 is a schematic view of a video encoding apparatus according to at least one embodiment of the present disclosure.

FIG. 9 is a block schematic diagram of a video encoding apparatus according to at least one embodiment of the present disclosure.

The video encoding apparatus according to at least one embodiment of the present disclosure corresponds to an apparatus for encoding an image by using a macroblock having a size larger than a size of 16×16, and may include a macroblock size setting unit 902, a predictor 903, an encoder 910, a reconstruction unit 912, a filter 914, and a frame memory 916. Here, the reconstruction unit 912, the filter 914, and the frame memory 916 may be omitted or included in a remaining component selectively depending on implementations. Other components of the video encoding apparatus, such as the macroblock size setting unit 902, the predictor 903, the encoder 910, the reconstruction unit 912, and the filter 914 comprise one or more processors and/or application-specific integrated circuits (ASICs) specified for respectively corresponding operations and functions described herein after. The frame memory 916 includes at least one non-transitory computer readable medium. The video encoding apparatus further comprises input units (not shown in FIG. 9) such as one or more buttons, a touch screen, a mic and so on, and output units (not shown in FIG. 9) such as a display, an indicator and so on. The video encoding apparatus further comprises communication modem(s) to receive and/or communication signals to thereby communicate with a video decoding apparatus through wire or wireless networks (herein, the wire or wireless networks include, for example, one or more network interfaces including, but not limited to, cellular, Wi-Fi, LAN, WAN, CDMA, WCDMA, GSM, LTE and EPC networks, and cloud computing networks).

The macroblock size setting unit 902 resets a macroblock size when the macroblock to be currently encoded is not fully located within the input image.

The macroblock size may be reset by reducing horizontal and vertical sizes of the current macroblock in a predetermined ratio, for example, by repeating ½ size reductions of the current macroblock or may be reset to the largest size, among the available macroblock sizes, which allows the macroblock to be located within the input image, only when the macroblock to be currently encoded is not fully located within the input image.

Alternatively, when the macroblock to be currently encoded is not fully located within the input image as a predetermined area, for example, an area smaller than ½ of the macroblock is overlapped with the input image, the macroblock size may be reset through the aforementioned method.

The predictor 903 may comprise a motion estimator 904, a motion compensator 906, and an intra prediction unit 908, and predicts a macroblock of the input image. Here, the macroblock refers to a macroblock having a size the same as or larger than 16×16 (or a macroblock having a size of M×N, where M and N are integers the same as or larger than 16).

The motion estimator 904 compares a macroblock to be predicted with a reference picture stored in the frame memory to estimate a motion of a corresponding macroblock and thereby generates a motion vector.

The motion compensator 906 fetches the number of blocks corresponding to a size of the macroblock to be predicted from the reference picture stored in the frame memory with reference to the motion vector generated by the motion estimator 904. The macroblock fetched by the motion compensator 906 becomes a prediction macroblock having a predicted value of the macroblock to be predicted.

The intra prediction unit 908 performs an intra prediction of the macroblock to be predicted. For this purpose, the intra prediction unit 908 generates a reference block by using information on reconstructed neighboring pixels, which have been already encoded and decoded, compares the reference block and the target macroblock to be encoded to determine an intra prediction mode, and performs an intra prediction of the macroblock according to the determined intra prediction mode. The macroblock predicted by the intra prediction unit 908 becomes a predicted macroblock having a predicted value of the target macroblock.

The encoder 910 encodes a residual signal, which corresponds to the difference between pixel values of the target macroblock and the prediction macroblock, and the encoding is performed through a transform, a quantization, and an entropy coding of the residual signal. Further, when the encoder 908 performs an inter prediction of the macroblock to be encoded, the encoder 908 can encode information on a macroblock mode such as a macroblock size and motion information such as a motion vector generated by the motion estimator 904. When the encoder 908 performs an inter prediction of the target macroblock to be encoded, the encoder 908 can encode information on the macroblock mode such as the macroblock size and information on a prediction mode such as an intra prediction mode.

The reconstruction unit 912 performs an inverse quantization and an inverse transform of the transformed and quantized residual signal, and adds it to a predicted macroblock output from the predictor in order to reconstruct the target macroblock.

The filter 914 filters the reconstructed macroblock by using a filter such as a deblocking filter. The filtered reconstructed macroblock is stored in the frame memory 916 and used by the predictor 903 for predicting a subsequent macroblock or a macroblock of a subsequent picture.

Figure 10:
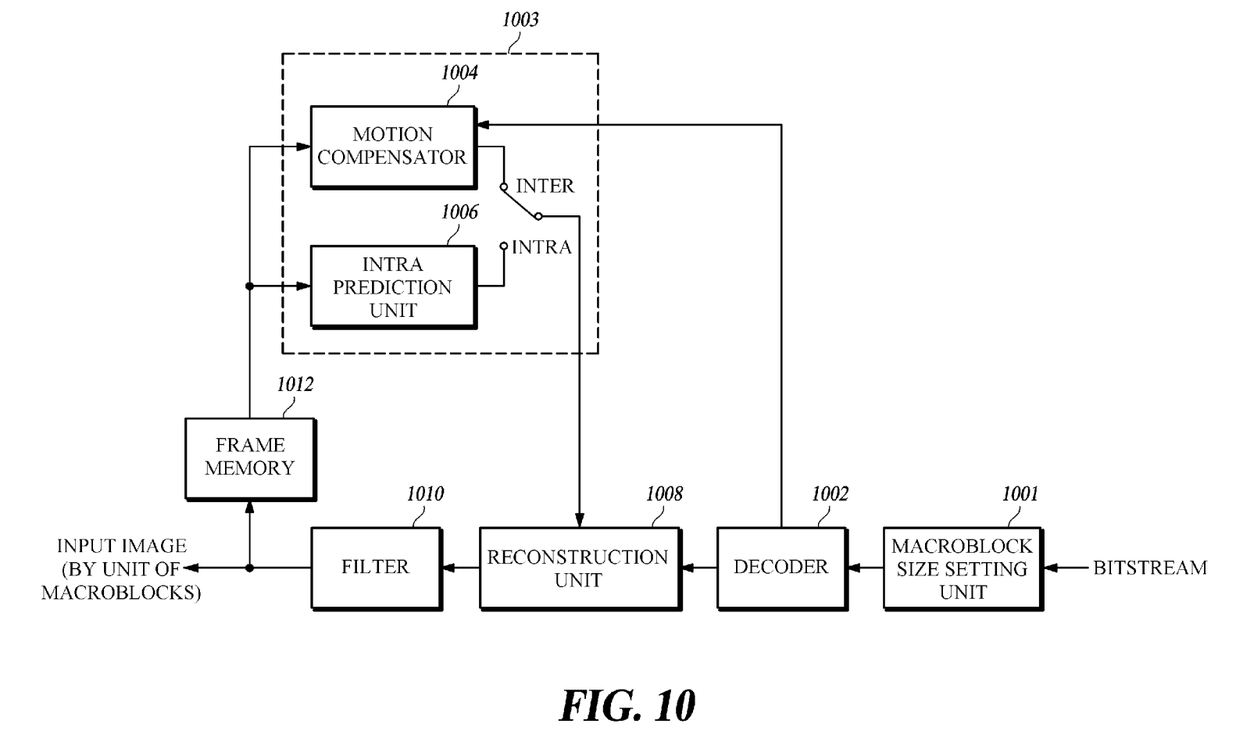
FIG. 10 is a schematic view of a video decoding apparatus according to at least one embodiment of the present disclosure.

FIG. 10 is a schematic block diagram of a video decoding apparatus according to at least one embodiment of the present disclosure.

The video decoding apparatus according to at least one embodiment of the present disclosure may include a macroblock size setting unit 1001, a decoder 1002, a predictor 1003, a reconstruction unit 1008, a filter 1010, and a frame memory 1012. Other components of the video decoding apparatus, such as the macroblock size setting unit 1001, the decoder 1002, the predictor 1003, the reconstruction unit 1008, and the filter 1010 comprise one or more processors and/or application-specific integrated circuits (ASICs) specified for respectively corresponding operations and functions described herein after. The frame memory 1012 includes at least one non-transitory computer readable medium. The video decoding apparatus further comprises input units (not shown in FIG. 10) such as one or more buttons, a touch screen, a mic and so on, and output units (not shown in FIG. 10) such as a display, an indicator and so on. The video decoding apparatus further comprises communication modem(s) to receive and/or communication signals to thereby communicate with a video encoding apparatus through wire or wireless networks (herein, the wire or wireless networks include, for example, one or more network interfaces including, but not limited to, cellular, Wi-Fi, LAN, WAN, CDMA, WCDMA, GSM, LTE and EPC networks, and cloud computing networks).

The macroblock size setting unit 1001 obtains the position of a target macroblock to be currently decoded by using the number of the same macroblock, and when the macroblock to be decoded is not fully located within the input image, it resets the size of the macroblock. In this event, the macroblock number may be obtained through an adding calculation by one per time increment of the count of the macroblocks decoded internally of the decoder, and an input image size may be acquired through extraction from the sequence header within the bitstream followed by a decoding.

The macroblock size may be reset with a predetermined ratio, for example, by repeating ½ reductions of the original macroblock size or may be reset to the largest size among the available macroblock sizes, which allows the macroblock to be located within the input image, only when the macroblock to be currently decoded is not fully located within the input image.

Alternatively, when the macroblock to be currently decoded is not fully located within the input image as a predetermined area, for example, an area smaller than ½ of the macroblock is overlapped with the input image, the macroblock size may be reset through the aforementioned method.

The decoder 1002 extracts three types of information required for decoding the macroblock from an input bitstream.

First, information on a macroblock type indicating whether the macroblock to be currently decoded is an inter macroblock or an intra macroblock and information on a subblock mode indicating a subblock mode of the macroblock are entropy-decoded and then extracted.

Second, information required for the prediction is entropy-decoded and then extracted. In this event, the type of prediction data to be decoded and the method of decoding the prediction data change depending on whether each block is an intra block or an inter block. When the block to be reconstructed is the inter macroblock, reference picture information and motion information such as a motion vector required for compensating for motions of respective subblocks are extracted from the bitstream and then decoded. When the block to be reconstructed is the intra block, information on the intra prediction mode of luma components and chroma components is extracted from the bitstream and then decoded.

Lastly, information required for decoding a residual signal is decoded. Decoding is performed initially on information (e.g. CBP) indicating whether there is a transform coefficient which is not "0" in each subblock for which transform information indicating a type of the transform and a quantized transform coefficient are decoded.

In this event, when the encoding apparatus does not encode data of the blocks located beyond the boundary of the input image within the macroblock into the bitstream, the decoder 1002 calculates positions of respective subblocks within the macroblock and determines whether current subblocks are located beyond the boundary of the input image. When the subblocks are located beyond the boundary of the input image, decoding is saved from performing with respect to information on a subblock mode, information required for the prediction, and information required for decoding a residual signal (i.e. neither extraction from the bitstream nor decoding is performed by the decoding apparatus for no encoding performed into the bitstream by the encoding apparatus).

The predictor 1003 predicts the current block to be decoded and may comprise a motion compensator 1004 and an intra prediction unit 1006. When the current block is an inter block, the motion compensator 1004 fetches the pixels of a number corresponding to the current macroblock size from the reference picture stored in the frame memory and generates a prediction macroblock, by using the motion vector reconstructed through the decoding by the decoder 1002. When the current block is an intra block, the intra prediction unit 1006 predicts the current macroblock and generates a prediction macroblock according to the intra prediction mode reconstructed through the decoding by the decoder 1002.

When the aforementioned method was used by the encoding apparatus for encoding the borderline blocks over the image boundary within the macroblock wherein the intra prediction mode or inter prediction mode (i.e. the information on motion vector and reference picture) is determined in consideration of only the requisite number of the bits and the information on the determined mode is encoded into the bitstream followed by reconstructing each block by using the method of padding the input image in generating the reconstructed block, the predictor 1006 calculates locations of the respective subblocks within the macroblock and determines whether there are borderline cases of the current blocks for which the extracted mode information from the bitstream is not credited but the padding method prearranged with the encoding apparatus is employed to generate the prediction block.

Further, even when the encoding apparatus does not encode data of the borderline blocks within the macroblock into the bitstream, it is determined whether current subblocks are located beyond the boundary of the input image and a prediction block is generated by using the padding method agreed with the encoding apparatus for the borderline subblocks.

The reconstruction unit 1008 inversely quantizes the quantized transform coefficient decoded by the decoding apparatus, extracts it from the decoder 1002, inversely transforms the inversely quantized transform coefficient by using a reconstructed transform type to generate a residual signal, adds the generated residual signal to the macroblock generated by the predictor, and generates a reconstructed macroblock. The generated reconstructed macroblock is filtered in the filter 1010, stored in the frame memory 1012, and used for reconstructing a subsequent macroblock or picture.

When the aforementioned method was used by the encoding apparatus for encoding the borderline blocks over the image boundary within the macroblock wherein the intra prediction mode or inter prediction mode (i.e. the information on motion vector and reference picture) is determined in consideration of only the requisite number of the bits and the information on the determined mode is encoded into the bitstream followed by reconstructing each block using the method of padding the input image in generating the reconstructed block, or when the encoding apparatus skips encoding data of the borderline blocks within the macroblock into the bitstream, it is determined whether there are borderline cases of the current subblocks for which the padding method prearranged with the encoding apparatus is employed to generate the prediction block and eventually the reconstructed block (i.e. it is considered that there is no residual signal).

The aforementioned method of decoding the macroblock including parts (blocks) located beyond the boundary of the input image within the macroblock may be used in combination with the known decoding methods.

According to various embodiments of the present disclosure as described above, when the size of the input image is not an integer multiple of the size of the macroblock in encoding and decoding the image, an outer area of the input image is encoded and decoded by using a variable macroblock size, whereby the compression efficiency and the reconstruction efficiency can be improved.

In the description above, although all of the components of the embodiments of the present disclosure have been explained as assembled or operatively connected as a unit, the present disclosure is not intended to limit itself to such embodiments. Rather, within the objective scope of the present disclosure, the respective components are able to be selectively and operatively combined in any numbers. Every one of the components is also implemented by itself in hardware while the respective ones can be combined in part or as a whole selectively and implemented in a computer program having program modules for executing functions of the hardware equivalents. Codes or code segments to constitute such a program are easily deduced by a person of ordinary skill in the art. The computer program is stored in non-transitory computer readable media, which in operation can realize various embodiments of the present disclosure. Examples of the non-transitory computer readable recording medium include magnetic recording media, such as a hard disk, a floppy disk, and a magnetic tape, and optical recording media, such as a compact disk read only memory (CD-ROM) and a digital video disk (DVD), magneto-optical media, such as a floptical disk, and hardware devices that are specially configured to store and execute program instructions, such as a ROM, a random access memory (RAM), and a flash memory.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person of ordinary skill in the art unless defined to the contrary. Common terms as found in dictionaries should be interpreted in the context of the related technical writings not too ideally or impractically unless the present disclosure expressly defines them so.

Although exemplary embodiments of the present disclosure have been described for illustrative purposes, those of ordinary skill in the art will appreciate that various modifications, additions and substitutions are possible, without the spirit and scope of the claimed invention. Specific terms used in this disclosure and drawings are used for illustrative purposes and not to be considered as limitations of the present disclosure. Therefore, exemplary embodiments of the present disclosure have not been described for limiting purposes. Accordingly, the scope of the claimed invention is not to be limited by the above embodiments but by the claims and the equivalents thereof.

What is claimed is:

1. An apparatus of decoding a video in the unit of blocks, the apparatus comprising:
   a size setting unit configured to
      decode information on a picture size of the video and information on available block sizes from a bitstream,
      set an initial size of a current block to be decoded to a largest block size determined by the information on the available block sizes,
      determine a location of the current block within a picture,
      identify whether the current block is fully located inside the picture, based on the picture size, the size of the current block and the location of the current block, and
      reset the size of the current block to a smaller size among the available block sizes, when the current block is not fully located inside the picture; and
   a decoding unit configured to decode the current block in the reset size.

2. The apparatus of claim 1, wherein the information on the picture size and the information on the available block sizes are decoded from sequence information of the bitstream.

3. The apparatus of claim 1, wherein the size setting unit is configured to reset the size of the current block by repeatedly reducing the size of the current block by half both in width and in height until the current block is fully located inside the picture.

4. The apparatus of claim 1, wherein the reset size of the current block is not smaller than the smallest block size among the available block sizes.

5. The apparatus of claim 1, wherein the largest block size is larger or equal to 16*16.

6. The apparatus of claim 1, wherein the decoding unit comprises:
   a decoder configured to
      divide the current block into one or more subblocks, and
      extract a type information on each of the subblocks and transform coefficients from a bitstream, wherein the type information indicates whether each subblock is inter-predicted or intra-predicted;
   a predictor configured to perform an intra prediction or an inter prediction for each subblock based on the type information; and
   a reconstruction unit configured to
      inversely quantize and inversely transform the transform coefficients to generate residual signals, and
      add the generated residual signals to values predicted by the predictor.

* * * * *